United States Patent [19]
Busby

[11] Patent Number: 5,244,224
[45] Date of Patent: Sep. 14, 1993

[54] ROCKER ARM REAR SUSPENSION BICYCLE

[75] Inventor: James S. Busby, Laguna Beach, Calif.

[73] Assignee: GT Bicycles, Inc., Huntington Beach, Calif.

[21] Appl. No.: 884,740

[22] Filed: May 14, 1992

[51] Int. Cl.⁵ ............................................ B62K 25/30
[52] U.S. Cl. .................................... 280/284; 280/275
[58] Field of Search ............... 280/285, 284, 283, 286, 280/275

[56] References Cited

U.S. PATENT DOCUMENTS

| | | | |
|---|---|---|---|
| 4,789,174 | 12/1988 | Lawwill | 280/284 |
| 5,121,937 | 6/1992 | Lawwill | 280/284 |

FOREIGN PATENT DOCUMENTS

| | | | |
|---|---|---|---|
| 3033294 | 4/1981 | Fed. Rep. of Germany | 280/285 |
| 428442 | 12/1947 | Italy | 280/285 |

OTHER PUBLICATIONS

1992 Cannondale Spec—Suspension Mountain Bicycles—Article 10 pages.
TREK 9000 Series Spec—"This Beauty Is A Beast-"—Article 8 pages.
Fisher RS-1—Article—4 pages—Mountain Bike Action/Mar. '92.
Suspension Mania Strikes Cycling—Mountain Bike Action/Feb. '92 3 pages.
Boulder Intrepid Al—2 pages—Mountain Bike Action/Mar. '92.
Team Shockblok—6 pages—Mountain Bike Action/Jul. '92.
Welcome to the Next Generation ... —9 pages—Mountain Bike June. '92.
Schwinn S.A.S.S.—7 pages—Mountain Bike Action—May 1992.
Offroad Pro—Flex 550—3 pages—Offroad.
If The Best Motorcycle ... "Litespeed Suspension", Mountain Bike—Jul. '92 8 pages.
Slingshot—*Mountain & City Biking*, 6 pages.

*Primary Examiner*—Margaret A. Focarino
*Assistant Examiner*—Kevin Hurley
*Attorney, Agent, or Firm*—Stetina and Brunda

[57] ABSTRACT

A bicycle frame having shock absorbing characteristics. The bicycle frame includes an elongate down tube and seat tube having a crossbar rigidly attached thereto and extending therebetween. Pivotally connected to a bottom bracket axle attached to the lower end of the seat tube is a rocker arm linkage. The frame further comprises a shock absorber having one end pivotally connected to the crossbar and a second end pivotally connected to the rocker arm linkage. Additionally, first and second chain stay members are provided having front ends pivotally connected to the opposed sides of the rocker arm linkage and rear ends rigidly attached to a pair of rear tire axle receiving members. First and second chain stay members are also included which have front ends pivotally connected to the crossbar and rear ends pivotally connected to the pair of rear tire axle receiving members. The rocker arm linkage is normally held in abutting contact against the axle receiving bracket by the force exerted thereagainst by the shock absorber and the chain stay members. Upon the exertion of a sufficient upward force to the rear tire axle receiving members, the rocker arm linkage is pivoted and caused to move out of abutting contact with the axle receiving bracket and compress the shock absorber.

9 Claims, 2 Drawing Sheets

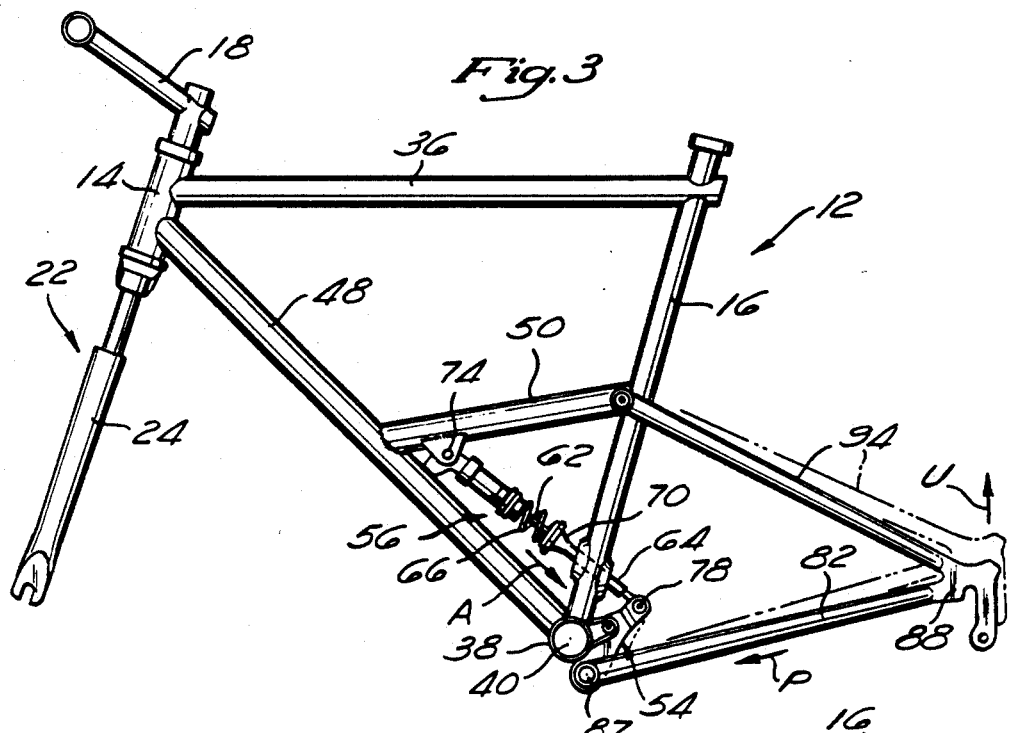
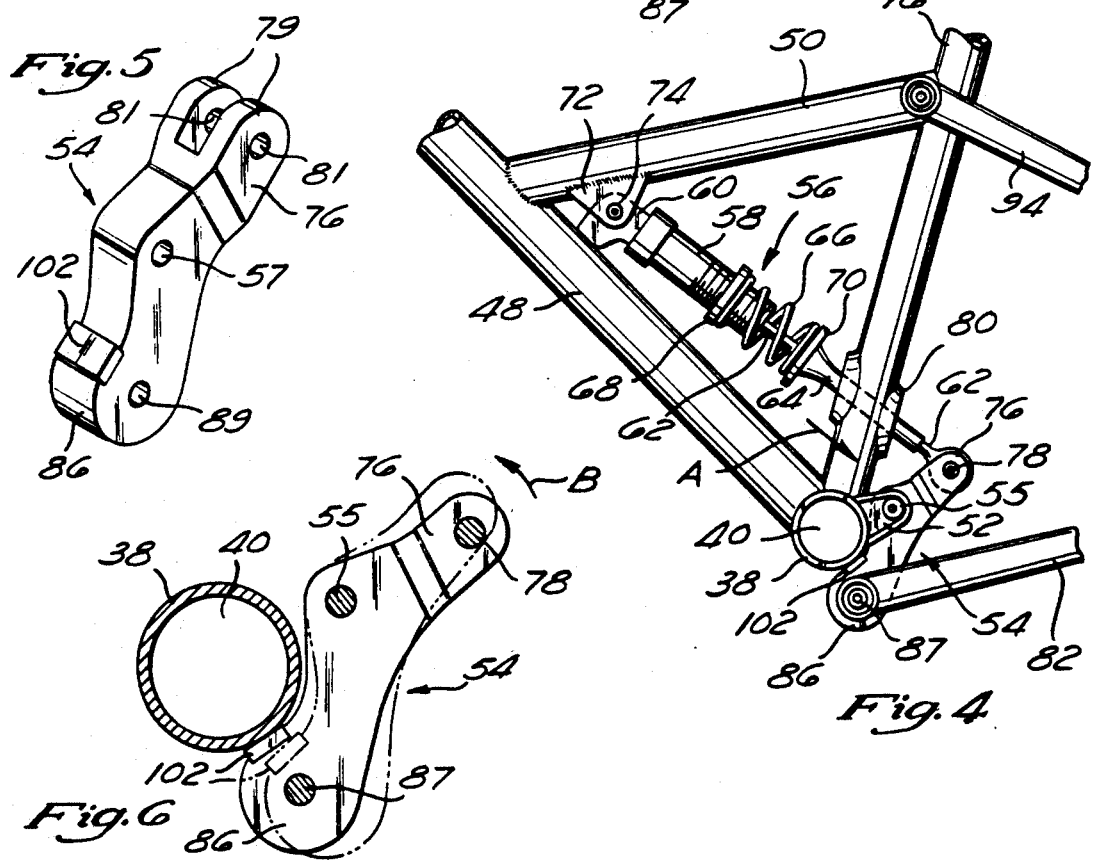

ROCKER ARM REAR SUSPENSION BICYCLE

FIELD OF THE INVENTION

The present invention relates generally to bicycles, and more particularly to a bicycle possessing shock absorbing suspension characteristics which do not adversely affect the performance of the bicycle.

BACKGROUND OF THE INVENTION

The primary structural component of a bicycle is the bicycle frame. Typically, the bicycle frame comprises an elongate crossbar which is rigidly secured to and extends between a head tube of the bicycle and a seat tube of the bicycle. The head tube typically provides a structural base for the stem of the bicycle to which the handle bars are attached. The seat tube provides a base for a seat post which is generally telescopically received therewithin and to which is secured that saddle or seat of the bicycle. In typical bicycle frame construction, the seat tube includes a generally cylindrical member attached to the lower end thereof which is adapted to receive the bottom bracket axle. The bottom bracket axle typically extends between and interconnects the cranks to which are attached the pedals. Rigidly secured to and extending between the head tube and the cylindrical axle receiving bracket is an elongate down tube.

In addition to the aforementioned structural components, rigidly secured to and extending rearwardly from the axle receiving bracket are first and second chain stay members. Additionally, rigidly secured to and extending downwardly from the upper end of the seat tube are first and second seat stay members having distal ends which are rigidly secured to the rear ends of the first and second chain stay members. Typically, the distal ends of the seat stay members and rear ends of the chain stay members are interconnected in a manner adapted to receive the rear tire axle of the bicycle.

The foregoing description generally represents the construction of conventional prior art bicycle frames. Typically, once such prior art frames are constructed, the aforementioned structural components are rigidly secured to one another through the use of welding or brazing techniques. Though this method of constructing the bicycle frame provides the resulting frame with structural integrity, the bicycle frame does not possess a suspension having shock absorbing characteristics. As will be recognized, the riding comfort and performance of the bicycle would be greatly enhanced if the bicycle frame were adapted to at least partially accommodate the shocks routinely encountered while riding the bicycle.

Though recent prior art bicycle frames include front and/or rear shock absorbing assemblies, such bicycle frames possess certain deficiencies which detract from their overall utility. In this respect, the manner in which the rear shock absorbing assemblies are typically interfaced to the seat stay members of the frame creates a significant amount of lateral instability for the rear wheel of the bicycle. As will be recognized, such instability severely diminishes the performance and handling characteristics of the bicycle. Additionally, many currently known rear shock absorbing assemblies create slop within the chain during normal and vigorous pedaling, thus adversely affecting the performance of and speed obtainable with the bicycle. The present invention specifically overcomes these and other deficiencies associated with prior art bicycle frames.

SUMMARY OF THE INVENTION

In accordance with a preferred embodiment of the present invention, there is provided a shock absorbing bicycle frame adapted to provide a bicycle with enhanced riding comfort and performance. The bicycle frame preferably comprises a head tube having a top end and a bottom end, and an elongate seat tube having an upper end and a lower end. Rigidly attached to and extending between the head tube and the seat tube is a first elongate crossbar. Additionally, rigidly attached to the lower end of the seat tube is an axle receiving bracket which defines an axle receiving bore extending axially therethrough. Rigidly attached to and extending between the head tube and the axle receiving bracket is an elongate down tube. Disposed between the first crossbar and the axle receiving bracket is a second crossbar having a front end rigidly attached to the down tube and a back end rigidly attached to the seat tube.

The bicycle frame of the present invention further comprises a rocker arm linkage which is pivotally connected to the axle receiving bracket. To facilitate the shock absorbing capability of the bicycle frame, a shock absorber is provided having a first end pivotally connected to the second crossbar and a second end pivotally connected to the rocker arm linkage. In the preferred embodiment, the down tube is provided with an aperture extending therethrough which is sized and configured to allow passage of a portion of the shock absorber. The bicycle frame also includes first and second chain stay members having front ends pivotally connected to opposed sides of the rocker arm linkage and back ends rigidly attached to a pair of rear tire axle receiving members. Also provided are first and second seat stay members having front ends pivotally connected to opposed sides of the second crossbar and back ends rigidly attached to the pair of tire axle receiving members. Extending through the axle receiving bore of the axle receiving bracket is a bottom bracket axle. Attached to one end of the bottom bracket axle is a main sprocket which is adapted to rotate concurrently therewith. The bicycle frame further comprises a pair of cranks having proximal ends attached to the opposed ends of the bottom bracket axle and distal ends including a pair of pedals pivotally connected thereto. Extending between the pair of rear tire axle receiving members is a rear tire axle having a rear sprocket attached to one end thereof. Additionally, a continuous chain is provide to cooperatively engage the main sprocket to the rear sprocket.

In the preferred embodiment, the shock absorber is adapted to exert a force on a upper portion of the rocker arm linkage so as to cause a lower portion of the linkage to be normally abutted against the axle receiving bracket. Additionally, the chain of the bicycle is operable to exert a pulling force on the rear sprocket when the main sprocket is rotated via the pedals, cranks and bottom bracket axle. This pulling force is operable to cause the rear sprocket to apply a forward pushing force to the chain stay members thus increasing the force of the abutting contact between the lower portion of the rocker arm linkage and the axle receiving bracket.

In the preferred embodiment, the rocker arm linkage is adapted to pivot relative the axle receiving bracket such that the lower portion moves out abutting contact with the axle receiving bracket and the upper portion compresses the shock absorber. This pivotal movement of the rocker arm linkage occurs when an upward force is applied to the rear tire axle receiving brackets in an amount sufficient to overcome the force normally applied to the upper portion by the shock absorber and the pushing force applied to the chain stay members by the rear sprocket. As will be recognized, an upward force of this magnitude is only applied when the rear tire of the bicycle is subjected to a significant shock. However, the pivotal movement applied to the rocker arm linkage caused by such a shock compresses the shock absorber thus dampening the force of the shock. Advantageously, since the lower portion of the rocker arm linkage is normally held in abutting contact with the axle receiving bracket by the shock absorber as well as the pushing force applied by the chain stay members, the shock absorber does not serve as a primary structural member of the bicycle frame and thus does not create slop in the chain during pedaling. As such, though a shock absorber is included in the bicycle frame, the performance of the bicycle is not adversely affected thereby.

In the preferred embodiment, the shock absorber is configured so as to allow for the selective adjustment of the amount of force exerted on the upper portion of the rocker arm linkage thereby. Additionally, the rocker arm linkage is preferably provided with a pad member attached to the lower portion thereof so as to be disposed between the lower portion and the axle receiving bracket when the lower portion is abutted thereagainst. In this respect, the pad member is utilized to prevent metal-to-metal contact between the axle receiving bracket and the lower portion.

BRIEF DESCRIPTION OF THE DRAWINGS

These as well as other features of the present invention will become more apparent upon reference to the drawings wherein:

FIG. 3 is a side elevational view of the bicycle frame of the present invention;

FIG. 4 is a side elevational view of the rocker arm linkage and shock absorber of the bicycle frame;

FIG. 5 is a perspective view of the rocker arm linkage; and

FIG. 6 is a side elevational view illustrating the pivotal movement of the rocker arm linkage relative the axle receiving bracket.

DETAILED DESCRIPTION OF THE PREFERRED EMBODIMENT

Figures 1, 2:
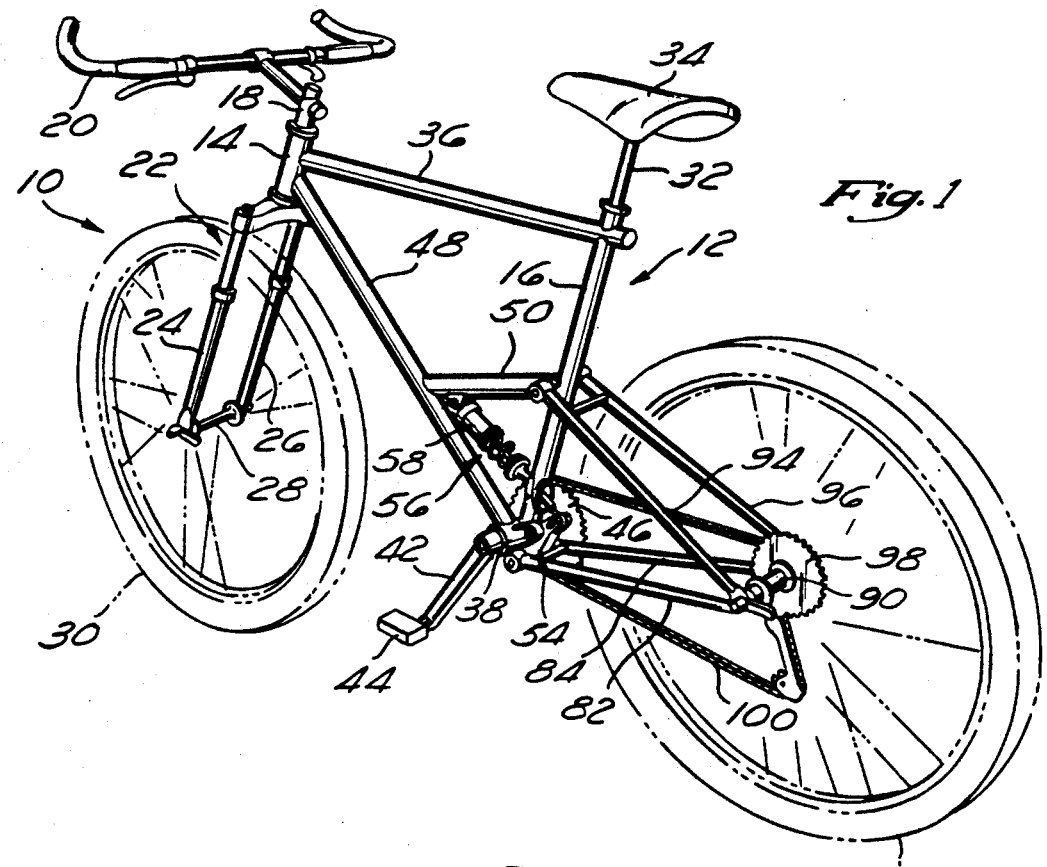
FIG. 1 is a perspective view of a bicycle incorporating a bicycle frame constructed in accordance with the present invention.
FIG. 2 is a rear perspective view of the rocker arm linkage pivotally connected to the axle receiving bracket and the shock absorber pivotally connected thereto.

Referring now to the drawings wherein the showings are for purposes of illustrating a preferred embodiment of the present invention only, and not for purposes of limiting the same, FIG. 1 perspectively illustrates a bicycle 10 incorporating a bicycle frame 12 constructed in accordance with the present invention. The bicycle frame 12 generally comprises a head tube 14 disposed at the front end of the bicycle 10 and a seat tube 16 disposed toward the rear end of the bicycle 10. Connected to the top end of the head tube 14 is a stem 18 to which is attached the handle bars 20. Connected to the bottom end of the stem 18 is a conventional front shock absorber assembly 22 defining a first fork 24 and a second fork 26 between which is mounted the axle 28 of the front wheel 30. Importantly, the front shock absorber assembly 22 is adapted to provide the compressive first fork member 24 and second compressive fork member 26 with shock absorbing capability. Telescopically received into the top end of the seat tube 16 is a seat post 32 having a saddle or seat 34 connected thereto.

Rigidly attached to and extending between the head tube 14 and the seat tube 16 is an elongate first crossbar 36. Additionally, rigidly attached to the bottom end of the seat tube 16 is an axle receiving bracket 38 having an axle receiving bore 40 extending axially therethrough. In the preferred embodiment, the axle receiving bracket 38 has a generally cylindrical configuration and is attached to the lower end of the seat tube 16 via a brazed or welded connection. The bore 40 of the axle receiving bracket 38 is sized and configured to receive a bottom bracket axle of the bicycle 10. Attached to the opposed ends of the bottom bracket axle are first and second cranks 42 to which are attached pedals 44. Additionally, attached to one end of the bottom bracket axle between the bottom bracket axle and a crank 42 is a main sprocket 46 which is adapted to rotate concurrently with the bottom bracket axle. Rigidly attached to and extending between the head tube 14 and the axle receiving bracket 38 is an elongate down tube 48. Disposed between the first crossbar 36 and axle receiving bracket 38 is a second crossbar 50 having a front end rigidly attached to the down tube 48 and a back end rigidly attached to the seat tube 16. In the preferred embodiment, head tube 14, seat tube 16, first crossbar 36, axle receiving bracket 38, down tube 48 and second crossbar 50 each have generally cylindrical configurations and are secured to one another via welded or brazed connections.

Referring now to FIGS. 2-6, a rocker arm linkage is pivotally connected to the axle receiving bracket 38 via a pair of extensions 52. The rocker arm linkage 54 is pivotally secured between the extensions 52 via a fastener 55 extending through apertures formed through the extensions 52 which are coaxially aligned with an aperture 57 disposed within the rocker arm linkage 54. Attached to and extending between the rocker arm linkage 54 and second crossbar 50 is a shock absorber 56. Shock absorber 56 generally comprises a cylindrical member 58 having a partially threaded lower end and an upper end having a connector bracket 60 attached thereto. Extending axially from the lower end of the cylindrical member 58 is a rod member 62 having a sleeve member 64 disposed thereabout. Disposed between the cylindrical member 58 and sleeve member 64 is a compression spring 66 which is maintained in its orientation by an adjustment member 68 threadably engaged to the lower threaded end of the cylindrical member 58 and a flange 70 formed about one end of the sleeve member 64.

In the preferred embodiment, the connector bracket 60 is pivotally connected to a mounting bracket 72 rigidly attached to the underside of the second crossbar 50 adjacent the front end thereof via the receipt of a fastener 74 through coaxially aligned apertures disposed within the walls of the mounting bracket 72 and within the connector bracket 60. The distal end of the rod member 62 is pivotally connected to the upper portion 76 of the rocker arm linkage 54 via a fastener 78. In this respect, the distal end of the rod member 62 has a circular configuration and is received and secured between a pair of flanges 79 formed on the upper portion 76 of the rocker arm linkage 54 via the fastener 78. The fastener 78 is received into the apertures 81 disposed within the flanges 79 which are coaxially aligned with one another and with an aperture disposed within the distal end of the rod member 62. As best seen in FIGS. 2 and 4, when the distal end of the rod member 62 is pivotally connected to the upper portion 76, portions of both the rod member 62 and sleeve member 64 disposed thereabout extend through an opening disposed within the lower end of the seat tube 16. In the preferred embodiment, the opening is formed by a tubular member 80 rigidly secured within a complimentary aperture disposed within the seat tube 16.

The bicycle frame 12 of the present invention further comprises a first chain stay member 82 and a second chain stay member 84 having front ends pivotally connected to the opposed sides of the lower portion 86 of the rocker arm linkage 54. In the preferred embodiment, the front ends of the first chain stay member 82 and the second chain stay member 84 are secured to the opposed sides of the lower portion 86 via a fastener 87 extending through apertures disposed in the front ends of the first and second chain stay members 82, 84 which are coaxially aligned with an aperture 89 disposed within the lower portion 86. The back ends of the first and second chain stay members 82, 84 are rigidly attached to a pair of rear tire axle receiving members 88 which are adapted to support the rear tire axle 90 of the rear wheel 92 therebetween. Also provided are a first seat stay member 94 and a second seat stay member 96 having front ends which are pivotally connected to the opposed sides of the second crossbar 50 adjacent the back end thereof. The back ends of the first and second seat stay members 94, 96 are likewise rigidly attached to the rear tire axle receiving members 88. Attached to one end of the rear tire axle 90 is a rear sprocket 98 which is adapted to rotate concurrently therewith. As seen in FIG. 1, a continuous chain 100 cooperatively engages the main sprocket 46 to the rear sprocket 98 such that rotation of the main sprocket will cause the concurrent rotation of the rear sprocket 98.

In the preferred embodiment, the shock absorber 56 is adapted to exert a force on the rocker arm linkage 54 in the direction designated by the arrow A shown in FIGS. 3 and 4. As will be recognized, due to the pivotal connection of the rocker arm linkage 54 to the axle receiving bracket 38, the force A generates a moment force about the pivot axis of the rocker arm causing the lower portion 86 of the rocker arm linkage 54 to be normally abutted against the outer surface of the axle receiving bracket 38. Additionally, when the main sprocket 46 is rotated via the pedals 44, cranks 42 and bottom bracket axle, the chain 100 exerts a pulling force on the rear sprocket 98. This pulling force in turn to causes the rear sprocket 98 to apply a forward pushing force to the first and second chain stay members 82, 84 in the direction shown by the arrow P in FIG. 3. The force P works in concert with the force A applied by the shock absorber 56 to additionally generate a moment force about the pivot axis of the rocker arm to increase the force of abutting contact between the lower portion 86 of the rocker arm linkage 54 and the outer surface of the axle receiving bracket 38.

As seen in FIGS. 3 and 6, an upward force designated by the arrow U as would be applied to the rear tire axle receiving members 88 when the rear tire 92 encounters a significant bump or shock, causes the first and second chain stay members 82, 84 and first and second seat stay members 94, 96 to pivot upwardly. Due to the connection of the front ends of the first and second chain stay members 82, 84 to the lower portion 86 of the rocker arm linkage 54, the upward movement of the first and second chain stay members 82, 84 and seat stay members 94, 96 will cause the rocker arm linkage 54 to pivot in the direction designated by the arrow B in FIG. 6. This pivotal movement causes the lower portion 86 to move out of abutting contact with the axle receiving bracket 38 and causes the upper portion 76 to compress the shock absorber 56, and more particularly the compression spring 66 thereof. The compression of the shock absorber 56 by the rocker arm linkage 54 serves to dampen the shock causing the upward force U. For the upward force U to cause the first and second chain stay members 82, 84 and seat stay members 94, 96 to pivot upwardly, the force U must exceed the force A exerted by the shock absorber 56 on the rocker arm linkage 54 and the force P if exerted on the rocker arm linkage 54 by the first and second chain stay members 82, 84 during rotation of the pedals and cranks. Thus, only significant shocks applied to the rear tire 92 will cause the lower portion 86 of the rocker arm linkage 54 to move away from its abutting contact with the outer surface of the axle receiving bracket 38 during pedaling of the bicycle. Thus the suspension does not adversely affect bicycle power performance as typically encountered in the prior art.

Advantageously, since the lower portion 86 of the rocker arm linkage 54 is normally abutted against the axle receiving bracket 38 and only displaced therefrom when a significant shock is encountered, the shock absorber 56 does not serve as a primary structural member of the bicycle frame 12. The resultant rigidity of the frame 12 aids in eliminating slop within the chain 100 when the bicycle 10 is being pedaled by the rider. As will be recognized, slop within the chain 100 adversely affects the performance characteristics of the bicycle 10 by increasing the difficulty associated with maintaining the speed of the bicycle. As previously specified, the abutting contact between the rocker arm linkage 54 and axle receiving bracket 38 which substantially eliminates chain slop is only lost when a shock is encountered by the rear wheel 92 sufficient to momentarily overcome the forces applied to the rocker arm linkage 54 by the shock absorber 56 and first and second chain stay members 82, 84.

As best seen in FIGS. 5 and 6, attached to the lower portion 86 of the rocker arm linkage 54 is a pad member 102. In the preferred embodiment, pad member 102 is oriented upon the lower portion 86 so as to be disposed between the lower portion 86 and the outer surface of the axle receiving bracket 38 when the lower portion 86 is abutted thereagainst. In this respect, the pad member 102 prevents direct metal-to-metal contact thereby eliminating wear to the rocker arm linkage 54 and axle receiving bracket 38. Additionally, the amount of force A exerted upon the upper portion 76 of the rocker arm linkage 54 by the shock absorber 56 may be adjusted via the utilization of the adjustment member 68. In this respect, the force A of the shock absorber 56 against the rocker arm linkage 54 is increased by turning the adjustment member 68 in a counter-clockwise direction thus causing it to move toward the lower end of the cylindrical member 58 and further compress the compression spring 66. Conversely, by rotating the adjustment member 68 in a clockwise direction, the adjustment member 68 moves toward the connecter bracket 60 thus decreasing the compression of the compression spring 66 and decreasing the force A exerted against the rocker arm linkage 54.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A shock-absorbing bicycle frame comprising:
   a head tube having a top end and a bottom end;
   an elongate seat tube having an upper end and a lower end;
   a first elongate cross bar rigidly attached to and extending between said head tube and said seat tube;
   an axle receiving bracket rigidly attached to said lower end of said seat tube and defining an axle receiving bore extending axially therethrough;
   an elongate down tube rigidly attached to and extending between said head tube and said axle receiving bracket;
   a second cross bar disposed between said first cross bar and said axle receiving bracket and having a front end rigidly attached to said down tube and a back end rigidly attached to said seat tube;
   a rocker arm linkage member pivotally connected to said axle receiving bracket said rocker arm linkage member having upper and lower portions;
   a shock absorber having a first end pivotally connected to said second cross bar and a second end pivotally connected to the upper portion of said rocker arm linkage member;
   first and second chain stay members having front ends pivotally connected to opposed sides of the lower portion of said rocker arm linkage member and back ends rigidly attached to a pair of rear tire axle receiving members; and
   first and second seat stay members having front ends pivotally connected to opposed sides of said second cross bar and back ends rigidly attached to the pair of rear tire axle receiving members;
   said rocker arm linkage member being positioned relative said axle receiving bracket such that the lower portion is disposed below said axle receiving bracket and the upper portion is disposed between said seat and chain stay members, and configured in a manner wherein the upward pivotal movement of said pair of rear tire axle receiving members is operable to cause said rocker arm linkage member to compress said shock absorber.

2. The device of claim 1 wherein said shock absorber is adapted to exert a force on said upper portion of said rocker arm linkage member so as to cause said lower portion of said rocker arm linkage member to be normally abutted against said axle receiving bracket.

3. The device of claim 2 wherein said rocker arm linkage member is adapted to pivot relative said axle receiving bracket such that said lower portion moves out of abutting contact with said axle receiving bracket and said upper portion compresses said shock absorber when an upward force is applied to the rear tire axle receiving brackets in an amount sufficient to overcome the force normally applied to said upper portion by said shock absorber.

4. The device of claim 3 wherein said shock absorber is configured so as to allow for the selective adjustment of the amount of force exerted on the upper portion of the rocker arm linkage member thereby.

5. The device of claim 3 further comprising a pad member attached to the lower portion of the rocker arm linkage so as to be disposed between said lower portion and said axle receiving bracket when said lower portion is abutted thereagainst.

6. The device of claim 3 further comprising:
   a bottom bracket axle extending through said axle receiving bore;
   a main sprocket attached to one end of said bottom bracket axle and adapted to rotate concurrently therewith;
   a pair of cranks having proximal ends attached to the opposed ends of said bottom bracket axle and distal ends including a pair of pedals pivotally connected thereto;
   a rear tire axle extending between said pair of rear tire axle receiving members;
   a rear sprocket attached to one end of said rear tire axle and adapted to rotate concurrently therewith; and
   a continuous chain cooperatively engaging said main sprocket to said rear sprocket;
   said chain being operable to exert a pulling force on said rear sprocket when said main sprocket is rotated via said pedals, cranks and bottom bracket axle, said pulling force being operable to cause said rear sprocket to apply a forward pushing force to said chain stay members thus increasing the force of abutting contact between said lower portion and said axle receiving bracket.

7. The device of claim 6 wherein said rocker arm linkage member is adapted to pivot relative said axle receiving bracket when the upward force is applied to the rear tire axle receiving members in an amount sufficient to overcome the force normally applied to said upper portion by said shock absorber and the pushing force applied to the chain stay members by the rear sprocket.

8. The device of claim 1 wherein said down tube includes an aperture extending therethrough which is sized and configured to allow passage of a portion of the shock absorber.

9. A shock absorber bicycle frame comprising:
   a head tube having a top end and a bottom end;
   an elongate seat tube having an upper end and a lower end;
   a first elongate cross bar rigidly attached to and extending between said head tube and said seat tube;
   an axle receiving bracket rigidly attached to said lower end of said seat tube and defining an axle receiving bore extending axially therethrough;
   an elongate down tube rigidly attached to and extending between said heat tube and said axle receiving bracket;
   a second cross bar disposed between said first cross bar and said axle receiving bracket and having a front end rigidly attached to said down tube and a back end rigidly attached to said seat tube;
   a rocker arm linkage member pivotally connected to a portion of said bicycle frame, said rocker arm linkage having upper and lower portions;

a shock absorber having a first end pivotally connected to said second cross bar and a second end pivotally connected to said rocker arm linkage member, said shock absorber being adapted to exert a force on the upper portion of said rocker arm linkage member so as to cause the lower portion of said rocker arm linkage member to be normally abutted against a portion of said bicycle frame;

first and second chain stay members having front ends pivotally connected to opposed sides of said rocker arm linkage member and back ends rigidly attached to a pair of rear tire axle receiving members; and first and second seat stay members having front ends pivotally connected to opposed sides of said second cross bar and back ends rigidly attached to the pair of rear tire axle receiving members.

* * * * *